United States Patent [19]

Shabtai

[11] 4,238,364

[45] Dec. 9, 1980

[54] CLASS OF CRACKING CATALYSTS ACIDIC FORMS OF CROSS-LINKED SMECTITIES

[75] Inventor: Joseph Shabtai, Salt Lake City, Utah

[73] Assignee: University of Utah, Salt Lake City, Utah

[21] Appl. No.: 26,636

[22] Filed: Apr. 3, 1979

[51] Int. Cl.³ .............................................. B01J 29/02
[52] U.S. Cl. .............................. 252/455 R; 252/455 Z
[58] Field of Search ............... 252/455 R, 455 Z, 450; 423/118, 328

[56] References Cited

U.S. PATENT DOCUMENTS

| 3,746,659 | 7/1973 | Horzepa | 252/455 R |
| 3,795,606 | 3/1974 | Jaffe | 252/455 R |
| 3,798,177 | 3/1974 | Reed et al. | 252/455 R |
| 3,888,793 | 6/1975 | Arey, Jr. et al. | 252/455 R |

Primary Examiner—Carl F. Dees

[57] ABSTRACT

Novel types of molecular sieve cracking catalysts and method of preparation, the catalysts consisting of acidic forms of partially cross-linked smectites and including ions of hydrogen and rare-earth elements such as cerium, gadolinium, lanthanum, neodymium, praseodymium and samarium. In the catalyst preparation, the unit layer structure of the smectite is retained and the effective pore size obtained (8 A-30 A) is sufficiently large to accommodate molecules with a kinetic diameter greater than about 8 A.

14 Claims, 1 Drawing Figure

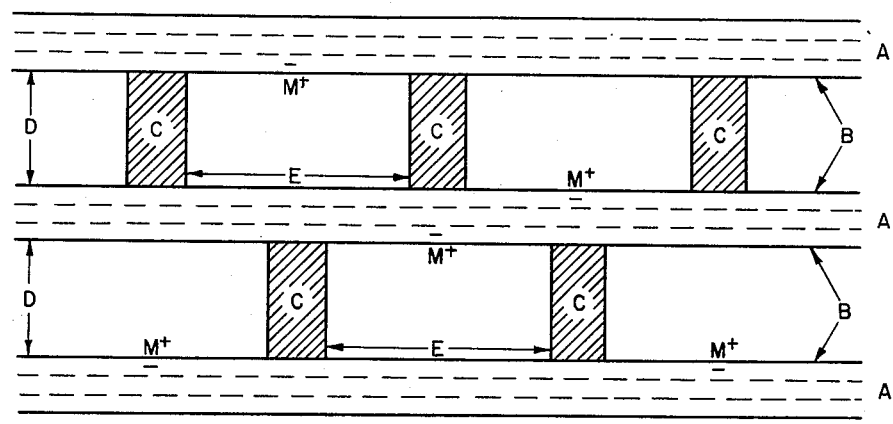

CLASS OF CRACKING CATALYSTS ACIDIC FORMS OF CROSS-LINKED SMECTITIES

BACKGROUND

1. Field of the Invention

This invention relates to the preparation and properties of novel types of molecular sieve cracking catalysts consisting of cross-linked smectites. The cross-linked smectite structure includes either hydrogen or rare-earth cations and has a relatively large pore size which allows the catalysts to be used in cracking reactions of molecules having relatively large kinetic diameters such as found in heavy petroleum cuts, coalderived liquids, shale oils, and the like.

2. The Prior Art

Recent developments relating to the cost, availability and reserve depletion of worldwide stocks of petroleum has focused increasing attention on conservation and development of alternate sources of synthetic liquid and gaseous fuels from materials such as coal, oil shale, and tar sands. Likewise, attention is also being directed to better utilization of native black oils and petroleum resids. The conversion of these heavy liquids to distillate products such as gasoline usually requires catalytic processing. One of the most important and well-established catalytic processes is catalytic cracking.

The relatively recent discovery and development of molecular sieve catalysts has had a tremendous impact on the petroleum refining industry in that the conversion rates as well as products distribution were greatly improved. Accordingly, as one considers the upgrading of heavy liquid and solid feedstocks into light liquid fuels, it is possible to visualize the benefits which could be realized with molecular sieves of optimized pore dimensions and with the desired degree of catalytic activity for effective cracking of such feedstocks.

Te polymeric backbone of molecular sieve systems can be inorganic, organic or composite in nature. As a rule, such systems possess an intracrystalline pore network of well-defined geometry and critical cross-sectional sizes. Catalysis of organic reactions by molecular sieves is characterized by several specific features:

(a) Organic substrates are "intrasorbed" in the sieve channel system, i.e. due to the constraining pore size and the "concave" geometry of the internal zeolitic surface an incoming molecule is usually under the simultaneous action of an ensemble of surrounding catalytic sites. Consequently, substrate polarization is considerably stronger, that is, activation is easier, compared to that with conventional catalysts. Further, as a result of approximation and orientation effects operative in the channel systems, intrasorbed reactant molecules are in many cases, favorably juxtaposed, with consequent decrease in the activation entropy of the reaction.

(b) Incorporation of catalytically active sites or chemically reactive species in the molecular sieve framework allows for the design and synthesis of a wide variety of specific adsorbents, catalysts and polymeric reagents.

(c) The specific geometry and dimensions of the channel system in a given molecular sieve catalyst allows for performance of molecular-shape selective processes.

During the past fifteen years, interest in molecular sieve systems has been primarily concerned with the structure, properties, and application of natural and synthetic zeolites. Appropriately modified zeolites have gained importance as adsorbents in separation of industrial mixtures, or as catalysts for certain types of organic processes such as cracking, hydrocracking, isomerization, hydroisomerization, alkylation and dealkylation of simple aromatics, etc. However, it has been realized that there are certain severe limitations in the catalytic application of zeolites. In particular, due to the narrow range of critical pore sizes found in such systems (approximately 3-10 A) intrasorption and reaction of bulky or even medium-sized organic molecules is impossible. For instance, it has been demonstrated that most of the molecules present in raw coal liquids cannot penetrate into the intracrystalline pores of conventional zeolite catalysts. Furthermore, certain organic substrates, including monocyclic aromatic compounds have exhibited low intracrystalline diffusivity in zeolitic media, resulting in poor recoveries and fast catalyst aging. It is, therefore, highly desirable to prepare a new class of molecular sieve catalysts with expanded pore size which would permit admission and free diffusion of large hydrocarbon and other molecules in the intracrystalline pore system. Additionally, it would also be an advancement in the art to provide a catalyst which will combine an expanded pore size (e.g. above about 10 A) with high acidity and cracking activity.

BRIEF SUMMARY AND OBJECTS OF THE INVENTION

This invention relates to the preparation and properties of novel cracking catalysts consisting of highly acidic forms of cross-linked smectites. The highly acidic forms are provided by introducing proper acidic functions, in particular, hydrogen ions and rare-earth cations such as those of cerium, lanthanum, samarium, neodymium, gadolinium, praseodymium, and the like into the cross-linked smectite framework. The preparation and properties of non-functionalized cross-linked smectite (CLS) frameworks has been described elsewhere (see U.S. Patent Application Ser. No. 836,138 filed September 23, 1977 for MOLECULAR SIEVES of which I am a joint inventor). The present invention relates specifically to the functionalization and conversion of such CLS systems into cracking catalysts. The preferred method of preparation for the novel catalysts of this invention includes preparing acidic forms of the smectite and thereafter performing a non-stoichiometric cross-linking of the acidic smectite with oligomeric species of aluminum hydroxide. Thereafter, the cross-linked material is stabilized by heat treatment. Since the cross-linking step affects only the interlamellar space of the smectite, the structure of the smectite unit layers is preserved. An alternative method of preparation which gives usually less active catalysts consists of ion-exchange of non-stoichiometrically cross-linked CLS molecular sieves.

It is, therefore, a primary object of this invention to provide a new and improved type of molecular sieve cracking catalysts.

Another object of this invention is to provide a method for producing new and improved molecular sieve cracking catalysts.

Another object of this invention is to provide molecular sieve catalysts consisting of cross-linked smectites, functionalized with ions of hydrogen, cerium, lanthanum, samarium, neodymium, gadolinium, praseodymium, and the like.

Another object of this invention is to provide a novel cracking catalyst including a cross-linked smectite, wherein the structure of the smectite unit layers is preserved and only the interlamellar space of the smectite is changed during the cross-linking step.

These and other objects and features of the present invention will become more fully apparent from the following description and appended claims taken in conjunction with the accompanying drawing.

BRIEF DESCRIPTION OF THE DRAWING

The drawing is a schematic illustration of a cross-section of the novel CLS cracking catalysts of this invention.

DETAILED DESCRIPTION OF THE PREFERRED EMBODIMENTS

The invention is best understood by reference to the drawing wherein like parts are designated with like numerals throughout.

GENERAL DISCUSSION

This invention relates to the preparation and properties of a new type of cracking catalysts consisting of highly acidic forms of cross-linked smectites. Customarily, the general process of synthesizing cross-linked smectites (CLS) framework materials consists of the following steps:

(1) The smectite component is fully dispersed in water, at room temperature, to give a colloidal solution containing separate, negatively charged unit layers.

(2) A sol of the metal hydroxide component, containing positively charged oligomeric species, is separately prepared either by slow hydrolysis of an appropriately buffered solution of the corresponding metal salt, or alternatively, by high dispersion of precipitated metal hydroxide in water.

(3) The two reactant colloidal solutions are thoroughly mixed causing rapid flocculation, which involves adsorption of the positively charged oligomeric metal hydroxide species on the negatively charged surface of the smectite unit layers.

(4) The cross-linked smectite, precipitated in step 3, is separated from the liquid phase by processes known in the art, such as filtration, centrifugation, freezedrying (lyophilizing), or simple air-drying.

(5) Finally, the solvent-free, cross-linked smectite is stabilized by heat treatment under air or an inert gas, e.g. nitrogen, usually in the temperature range of 150°–500° C.

The present invention specifically relates to a process for preparing highly efficient cracking catalysts by introducing proper acidic functions, in particular, hydrogen ions, and cations of rare-earth elements (cerium, lanthanum, samarium, gadolinium, neodymium, praseodymium and the like) in cross-linked smectite molecular sieve materials. Advantageously, the invention provides a method for preparing novel CLS cracking catalysts which have larger pore sizes (typically between 8–25 A) than those of conventional molecular sieve zeolites (typically between 3–9 A). The combination of high acidity and enlarged pore sizes in the CLS cracking catalysts of this invention results in dramatically higher activity of these catalysts for cracking of bulky or medium-sized hydrocarbons having kinetic diameters greater than 8 A, as compared to that of conventional cracking catalysts such as REY-type molecular sieve zeolites. The newly synthesized CLS catalysts also show higher resistance to sulfur and nitrogen poisoning as compared to that of the conventional REY-type zeolites.

The preferred method for preparation of the CLS cracking catalysts of this invention, that is, those containing hydrogen ions and rare-earth cations in the CLS framework consists of the following consecutive steps:

(1) Preparation of acidic forms, e.g. hydrogen ($H^+$)-or rare-earth ($RE^{3+}$)-forms of the smectite;

(2) Non-stoichiometric (partial) cross-linking of the acidic smectite with oligomeric species of aluminum hydroxide; and (3) Stabilization of the cross-linked material by heat treatment.

A schematic view of a cross-linked hydroxyaluminum montmorillonite catalyst, designated as M-Al-CLM, is given in the drawing wherein M represents the acidic ion. The schematic view demonstrates a CLS cracking catalyst wherein a montmorillonite unit layer; B—internal surface; C—oligomeric hydroxyaluminum cross-linking unit; D—interlayer spacing; E—lateral (interpillar) distance: and $M^+$—$H^+$ or $RE^{3+}$ ions) is shown.

It is typical for the above process for preparation that it is performed with preservation of the structure of the smectite unit layers, as the cross-linking step (Step No. 2) affects only the interlamellar space of the smectite. This is fundamentally different from the methods used in the preparation of clay-based and clay/gel-based zeolite cracking catalysts, since in these cases the clay (smectite) structure is subjected to drastic structural changes during the catalyst preparation process. For a full review of the prior art on the preparation of conventional zeolite cracking catalysts, attention is directed to "Zeolite Chemistry and Catalysis", J. S. Magee and J. J. Blasek, ASC Monograph 171, J. A. Rabo, Ed., American Chemical Society, Washington, D.C. pages 615–679 (1976).

The smectite used in the catalyst preparation of this invention is usually montmorillonite, possessing a charge density in the range of 0.8–1.1 meq/gram. However, smectites of lower or higher charge density can also be employed. The rare-earth metallic ions incorporated in the catalysts are primarily cerium (Ce, valence plus 3) and/or lanthanum (La, valence plus 3) or mixtures of those and smaller amounts of other trivalent ions, e.g. samarium (Sm, valence plus 3), gadolinium (Gd, valence plus 3), neodymium (Nd, valence plus 3), praseodymium (Pr, valence plus 3), and the like, present in commercial mixtures of rare earth metal salts.

The CLS cracking catalysts described in this invention possess the following characteristic physical properties:

(a) a pore system defined by a uniform interlayer distance of about 9 A and a lateral distance which can be controlled by the extent of cross-linking in the approximate range of 8–30 A;

(b) surface areas in the range of 100–250 square meters/gram of catalyst;

(c) resistance to swelling in water, and stability in steam treatment;

(d) excellent thermal stability at temperatures up to 550° C. Minor decreases in basal spacing (less than 1 A) are observed at temperatures above 400° C.

The most characteristic property of the newly synthesized CLS catalyst is an unusually high activity for cracking of bulky or medium-sized hydrocarbon molecules having kinetic diameters equal or larger than 9 A.

This characteristic activity is due to the relatively large pore sizes (lateral distances of 8–30 A) in CLS catalysts, which allow for intrasorption and cracking of large reactant molecules (kinetic diameters greater than 8 A) inside the interlamellar channel network of the catalysts as shown schematically in the drawing. In contrast, conventional molecular sieves, e.g. REY-type zeolite, show much lower catalytic cracking activity for large hydrocarbon molecules (critical kinetic diameters greater than 8 A) since such molecules are excluded, viz. cannot penetrate and/or freely diffuse, in the intracrystalline channel system of such zeolite catalysts (typical critical pore sizes equal to or less than 9 A).

The procedures of preparation of two typical CLS catalysts designated as H-Al-CLM and Ce-Al-CLM, are illustrated in Examples 1 and 2, respectively.

The great advantage and much higher catalytic cracking activity of these two catalysts, as compared to corresponding hydrogen and cerium forms of Y-type zeolite catalysts, are illustrated in Examples 3 and 4. The practical importance of the newly synthesized type of CLS cracking catalysts lies in their potential use as superior catalysts for cracking of heavy hydrocarbon oils, e.g. heavy petroleum cuts, coal-derived liquids, shale-derived liquids, tar-sand bitumens, etc.

EXAMPLE 1

The preparation of a typical H-Al-CLM catalyst (H-montmorillonite cross-linked with oligomeric species of aluminum hydroxide) was carried out using the following procedure:

30 g. of purified monoionic sodium montmorillonite was dispersed in 2 l. of distilled water, and the mixture was stirred for four hours. The mixture was then allowed to settle and the supernatant liquid layer (containing montmorillonite particles of less than 2 micron size) was syphoned off. The solid residue was again dispersed in water, and the procedure repeated several times. To the fine montmorillonite dispersion obtained was added dropwise and with constant stirring a slight excess of 0.1 N aqueous hydrochloric acid. The stirring was continued for four hours and the H-montmorillonite produced was separated and washed thoroughly by centrifugation until chloride-free, and finally dried in a lyophilizer.

2.85 g (3.0 meg) of H-montmorillonite was dispersed in 10 l of distilled water, and to this was added with vigorous stirring (3,000 rmp) 40 ml (3.0 meg) of the cross-linking agent consisting of an oligomeric solution of aluminum hydroxide (prepared in advance by titrating an aqueous 0.2 M $AlCl_3$ oligomeric solution formed was 4.1, and it was aged for two weeks before use). The flocculated cross-linked product was allowed to settle, and the supernatant liquid was syphoned off. The product was then washed, centrifuged and dried.

A series of H-Al-CLM catalysts, cross-linked to various degrees, was obtained by using the same procedure, but applying variable amounts of the cross-linking agent, viz. of the oligomeric $Al(OH)_3$ solution. The amounts of the latter, used in seven of these additional preparations were 0.5 meg, 0.75 meg, 1.0 meg, 1.5 meg, 2.0 meg, 4.0 meg, and 6.0 meg.

EXAMPLE 2

A typical Ce-Al-CLM catalyst, consisting of Ce-montmorillonite cross-linked with oligomeric species of aluminum hydroxide was prepared using the following procedure:

Purified sodium montmorillonite was ion-exchanged at 95° C. with a 0.4 N solution of $CeCl_3$, and the resulting Ce-montmorillonite was consecutively washed with distilled water and centrifuged until chloride-free, and finally freeze-dried.

In the subsequent cross-linking step, 3.0 meg of Ce-montmorillonite was dispersed in 10 l of distilled water, and to this was added with vigorous stirring (3,000 rpm) 20 ml (1.5 meg) of oligomeric $Al(OH)_3$ solution prepared as indicated in Example 1.

A series of Ce-Al-CLM catalysts, cross-linked to different degrees, were prepared by the same procedure, using variable amounts of the oligomeric aluminum hydroxide solution in the range of 0.25 to 6.0 meg.

All Ce-Al-CLM catalysts were stabilized and activated at 480° C. under a stream of dry nitrogen.

La-Al-CLM catalysts were prepared by the same procedure and were found to be somewhat more active than corresponding Ce-AL-CLM catalysts.

EXAMPLE 3

0.5 g of pelletized (1/16") H-AL-CLM catalyst, prepared according to the procedure given in Example 1 was placed as a fixed-bed inside a conventional flow reactor (i.d. 8 mm). The catalyst was activated at 480° C. under a slow stream of nitrogen for 2 hours, and, subsequently, the temperature was set at 400° C. Pure 1-isopropylnaphthalene was then introduced in the reactor at a constant liquid hourly space velocity (LHSV) of 6.0 $hr^{-1}$. The conversion of the liquid feed (1-isopropylnaphthalene) under these conditions was 56.5% by wt.

In a parallel experiment with stabilized HY-type zeolite as catalyst, under otherwise identical conditions, the conversion of the starting feed (1-isopropylnaphthalene) was 11.3% by wt.

EXAMPLE 4

0.5 g. of pelletized (1/16") C-Al-CLM, prepared according to the procedure given in Example 2, was used as cracking catalyst. The flow reactor, the catalyst activation procedure, the feed, and the reaction temperature (400° C.) were identical with those indicated in Example 3. The LHSV used was 7.5 $hr^{-1}$. The conversion of the feed (1-isopropylnaphthalene) under these conditions was 68.2% by wt.

In a parallel experiment with CeY-type zeolite as catalyst, under otherwise identical experimental conditions, the conversion of 1-isopropylnaphthalene was 15.8% by wt.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All claims that come within the meaning and range of equivalency of the claims are to be embraced within their scope.

What is claimed and desired to be secured by a United States Letters Patent is:

1. A novel cracking catalyst comprising a cross-linked smectite framework material functionalized with acidic ions selected from the group consisting of the ions of hydrogen and rare-earth elements.

2. The novel cracking catalyst defined in claim 1 wherein the cross-linked smectite framework material comprises non-stoichiometrically (partially) cross-linking with oligomeric species of aluminum hydroxide.

3. The novel cracking catalyst defined in claim 1 wherein the cross-linked smectite framework material has an enlarged pore size within the range on the order of about 8 A to 25 A.

4. The novel cracking catalyst defined in claim 1 wherein the cross-linked smectite framework material is formed while retaining the basic structure of the smectite unit layers.

5. The novel cracking catalyst defined in claim 1 wherein the smectite comprises a montmorillonite having a charge density within the range on the order of about 0.8 meq/gram to 1.1 meq/gram.

6. The novel cracking catalyst defined in claim 1 wherein the surface area of the catalyst is within the range on the order of about 100 square meters/gram to 250 square meters/gram of catalyst.

7. The novel cracking catalyst defined in claim 1 wherein the catalyst is resistant to swelling in water.

8. The novel cracking catalyst defined in claim 1 wherein the catalyst is stable in steam.

9. The novel cracking catalyst defined in claim 1 wherein the rare-earth elements are selected from the group consisting of cerium, gadolinium, lanthanum, neodymium, praseodymium, and samarium.

10. A method for preparing a novel molecular sieve cracking catalyst comprising:
preparing an acidic form of smectite including ions selected from the group consisting of hydrogen, cerium, gadolinium, lanthanum, neodymium, praseodymium, and samarium;
cross-linking the acidic form of smectite with oligomeric species of aluminum hydroxide and
stabilizing the cross-linked acidic form of smectite.

11. The method defined in claim 10 wherein the preparing step further comprises preserving the basic structure of the smectite unit layers.

12. The method defined in claim 10 wherein the cross-linking step further comprises controlling the extent of cross-linking to obtain a lateral distance in the interlayer space within the range on the order of about 8 A to 30 A thereby providing an effective lateral pore size within the range on the order of about 8 A to 30 A.

13. The method defined in claim 10 wherein the cross-linking step comprises producing a cross-linked smectite having an interlayer distance equal to or greater than about 9 A and corresponding to a basal spacing equal to or greater than about 18 A.

14. The method defined in claim 10 wherein the stabilizing step comprises heating the cross-linked smectite at temperatures within the range on the order of about 400° C. to 550° C.

* * * * *